G. SCARAMUZZA.
APPARATUS FOR THE INTERCHANGE OF HEAT.
APPLICATION FILED MAR. 20, 1908.
970,561.
Patented Sept. 20, 1910.
2 SHEETS—SHEET 1.
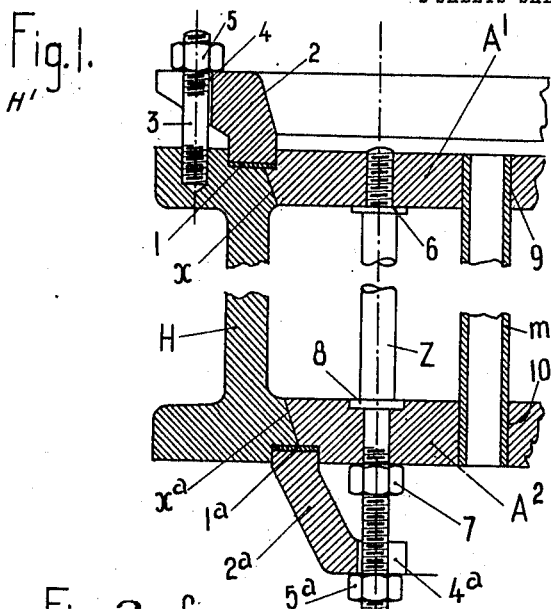
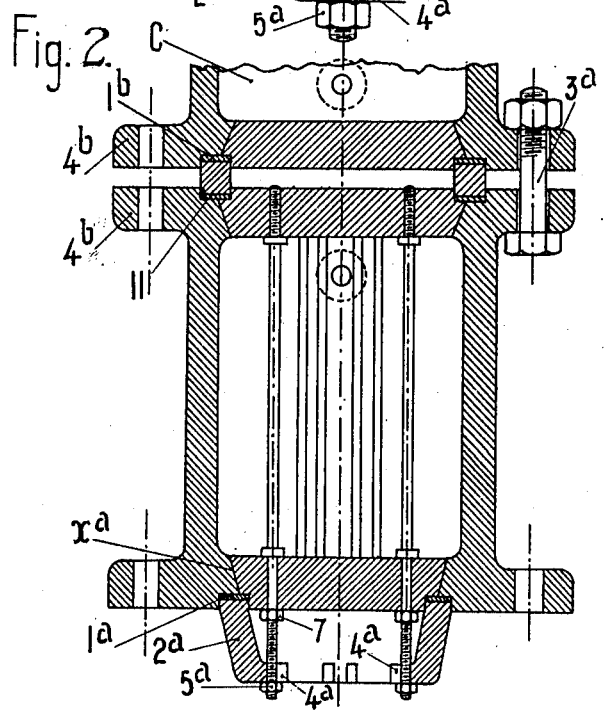
WITNESSES
W. P. Burk
W.H. Kennedy.
INVENTOR
Gino Scaramuzza G. SCARAMUZZA.
APPARATUS FOR THE INTERCHANGE OF HEAT.
APPLICATION FILED MAR. 20, 1908.

970,561.

Patented Sept. 20, 1910.
2 SHEETS—SHEET 2.

UNITED STATES PATENT OFFICE.

GINO SCARAMUZZA, OF TURIN, ITALY, ASSIGNOR TO SOCIETÀ ANONIMA PER FRIGORIGENI E MOTORI "MOTOFRIGOR," OF TURIN, ITALY.

APPARATUS FOR THE INTERCHANGE OF HEAT.

970,561.  Specification of Letters Patent.  Patented Sept. 20, 1910.

Application filed March 20, 1908. Serial No. 422,330.

*To all whom it may concern:*

Be it known that I, GINO SCARAMUZZA, engineer, residing in Turin, Via Mazzini 2, have invented certain new and useful improvements in apparatus for the interchange of heat between fluids under different pressures, particularly for cooling-machines, of which the following is a full, clear, and exact specification.

In apparatus for the interchange of heat between fluids which comprises a number of closely arranged hollow plates or cells within a chamber or series of chambers, it is important to keep the connections between the various parts properly tight.

The present invention relates to a method of forming tight connections in apparatus for the interchange of heat between fluids under different pressures simultaneously imparting strength and durability to the whole apparatus, or systems of apparatus.

In the accompanying drawing my invention is shown as applied to heating apparatus wherein the ends of a number of closely arranged hollow metal plates or cells are set in two metal plates which form the top and bottom of a chamber.

Figure 3:
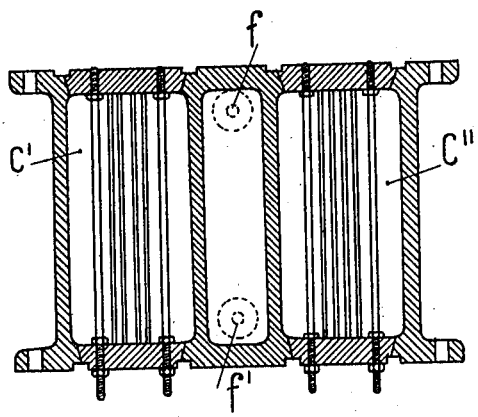
Figure 4:
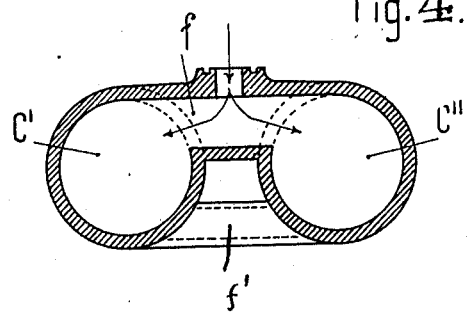

Figure 1 shows a section through an apparatus provided with the subject matter of the present invention. Fig. 2 shows the arrangement of the invention for a special system of connection of two apparatus in series. Figs. 3 and 4 show in a vertical and a horizontal section a method of connection of two series of apparatus.

$A^1$ and $A^2$ show, the upper and lower plates to which plates the tubes $m$ are secured. These tubes may be straight, or spirally shaped, or they may be also replaced by lamellæ forming cells. The edges of the end plates $A^1$ and $A^2$ are made conical and are so arranged that the conical parts are directed toward one and the same side (downwardly for example as shown in the drawing) and rest upon corresponding seats $x$ in the main part H of the apparatus. The upper end plate and its seat form in common an annular shaped depression into which fits a packing ring 1. Upon this packing ring is placed the corresponding lower face of an annular pressure appliance 2 which, by means of screw bolts 3, is secured to the body H of the apparatus. These screw bolts are screwed firstly to the body H of the apparatus and secondly are fitted into corresponding recesses in the flanges 4 of the annular cover 2 so that the screw nuts 5 exert a pressure upon the flanges, whereby the cover is so pressed down upon the packing ring 1 that the connection $x$ is kept perfectly tight. The lower end plate $A^2$ is secured to the upper end plate $A^1$ by means of the tie rods Z which pass through the former or both if preferred and are held by the nuts 7 which force the plate $A^2$ against the collars, or enlargements 8. By this arrangement the distance between $A^1$ and $A^2$ is made invariable and in consequence thereof no alteration in position between them is possible and also no transmission of pressure which would twist the tubes $m$ and so jeopardize the tightness of the junction 9 and 10 with the end plates $A^1$ and $A^2$. The lower end plate $A^2$ is provided similarly to the plate $A^1$ with a packing ring $1^a$ which is forced against the corresponding annular shaped cover $2^a$, the flanges $4^a$ of which are subjected to the action of the screw nuts $5^a$ which are screwed onto the end of the tie rods Z. In this way, that is to say, by rotating the screw nuts 5 and $5^a$, the junctions 1, $1^a$, $x$, $x^a$, are so forced together as to be made perfectly tight, while at the same time the tie rods Z fulfil their purpose of preventing any twisting and injurious transmission of pressure between $A^1$, $A^2$ and $m$.

The above described system of connection is suitable when it is desired to connect up two or more apparatus in series. In this case the annular cover assumes a rectangular form, as 11, and this cover so formed presses upwardly against the packing ring $1^b$ and downwardly against the other packing ring $1^a$. The pressure against the packing rings is produced by screws $3^a$ which press the flanges $4^b$ of the apparatus together. If it be desired to still further increase the capacity of the apparatus, they may be arranged in pairs as is shown in Figs. 3 and 4.

The chambers $C^1$ and $C^{11}$ which contain the heat interchanging elements communicate with each other by the aid of passages $f$ and $f^1$ situated at top and bottom and which regulate the entrance, the exit and the distribution of the fluid employed.

What I claim is:

1. An apparatus of the class described, comprising a casing having similarly directed beveled seats at each end thereof, beveled plates engaging said beveled seats and provided with perforations, tubes extending through said casing and having their ends engaging perforations in said end plates, registering recesses formed in the outer surfaces of the casing and the outer surfaces of said plates, packing positioned within said registering recesses, ring-shaped members extending within said recesses and engaging the packing, and means operatively engaging said rings and said casing for forcing said rings into said recesses.

2. An apparatus of the class described, comprising a casing having similarly directed beveled seats at each end thereof, beveled end plates engaging said beveled seats and provided with perforations, tubes extending through said casing and having their ends engaging perforations in said end plates, registering recesses formed in the outer surfaces of the casing and the outer surfaces of said end plates, packing positioned within said registering recesses, ring-shaped members extending within said recesses and engaging the packing, means operatively engaging said rings and said casing for forcing said rings into said recesses, and means for maintaining said plates at a predetermined distance from one another, irrespective of the pressure exerted by said rings.

In witness whereof, I have hereunto signed my name in the presence of two subcribing witnesses.

GINO SCARAMUZZA.

Witnesses:
  JOHN R. OZETTO,
  LOUIS ALLAN.